US011377180B2

(12) United States Patent
Bridges et al.

(10) Patent No.: US 11,377,180 B2
(45) Date of Patent: Jul. 5, 2022

(54) BUOYANCY TANK WITH INTEGRATED CYLINDRICAL STRUCTURES

(71) Applicants: Gary A. Bridges, Greenville, NC (US); Gary A. Bridges, II, Greenville, NC (US)

(72) Inventors: Gary A. Bridges, Greenville, NC (US); Gary A. Bridges, II, Greenville, NC (US)

(73) Assignees: Gary A. Bridges, Greenville, NC (US); Gary A. Bridges, II, Greenville, NC (US)

( * ) Notice: Subject to any disclaimer, the term of this patent is extended or adjusted under 35 U.S.C. 154(b) by 10 days.

(21) Appl. No.: 16/846,739

(22) Filed: Apr. 13, 2020

(65) Prior Publication Data

US 2021/0316831 A1 Oct. 14, 2021

(51) Int. Cl.
*B63C 1/02* (2006.01)
*B63C 3/06* (2006.01)
*B60P 3/10* (2006.01)

(52) U.S. Cl.
CPC ............. *B63C 3/06* (2013.01); *B60P 3/1033* (2013.01); *B63C 1/02* (2013.01)

(58) Field of Classification Search
CPC .... B63C 1/02; B63C 1/04; B63C 1/06; B63C 1/08; B63C 1/10; B63C 1/12; B63C 3/06
See application file for complete search history.

(56) References Cited

U.S. PATENT DOCUMENTS

| 8,683,934 | B2* | 4/2014 | Hey | B63C 1/06 |
| | | | | 114/46 |
| 9,266,590 | B1* | 2/2016 | Dye | B63B 3/08 |
| 9,352,812 | B1* | 5/2016 | Barnes | B63B 43/04 |
| 9,656,731 | B2* | 5/2017 | Doig | B63C 1/02 |
| 9,789,938 | B1* | 10/2017 | Hargreaves | B63B 27/16 |
| 2013/0152844 | A1* | 6/2013 | Imel | B63B 35/00 |
| | | | | 114/263 |
| 2016/0347430 | A1* | 12/2016 | Allen | B63B 35/38 |
| 2019/0135390 | A1* | 5/2019 | Barnes | B63C 1/06 |
| 2020/0055579 | A1* | 2/2020 | Wright | B63C 1/06 |

* cited by examiner

*Primary Examiner* — Andrew Polay
(74) *Attorney, Agent, or Firm* — Convergence Intellectual Property Law P.C.; Jonathan Garfinkel

(57) ABSTRACT

A buoyancy tank for a portable floatation apparatus which allows for the elevation of a watercraft above a water-line and which allows for the removal of the watercraft from a body of water. The buoyancy tank has at least one and/or a plurality of integrated cylindrical structures which supports the floatation apparatus in transport and storage. The integrated cylindrical structures provide sufficient support to allow the removal of the floatation apparatus by use of a boat lift and further provide sufficient support to allow a watercraft to be stacked on top of the floating apparatus while the floating apparatus is stacked on top of the floating apparatus for the purposes of storage. A plurality of said buoyancy tanks may be connected to the portable floatation apparatus by use of connecting means. The portable floatation apparatus should have a pumping device which pumps a sufficient volume of air into a plurality of the buoyancy tank which is effective to selectively and conveniently elevate a watercraft above a water line.

22 Claims, 7 Drawing Sheets

BUOYANCY TANK WITH INTEGRATED CYLINDRICAL STRUCTURES

FIELD OF THE INVENTION

The present invention generally relates to a buoyancy tank for a portable floatation apparatus which allows for the elevation of a watercraft out of a body of water, and allows for the safe and easy removal of the watercraft from the body of water by use of a boat trailer while being safe and easy to transport and store due to its portability and design.

BACKGROUND

Floatation apparatus have been and are used in a wide variety of applications, to selectively provide a predetermined amount of buoyancy in or for a multitude of objects. For example and without limitation, one type of floatation apparatus is adapted to elevate or raise a watercraft out of a body of water in order to conduct repairs on the hull of the watercraft, clean the hull of the watercraft, and store the watercraft above a water line to avoid hull damage (e.g., from ice during the winter).

By way of example and without limitation, previous methods and strategies for elevating a watercraft above a water line include physically removing the watercraft from the body of water, physically raising the watercraft out of the water with a mechanical raising assembly, and employing another individual, party, or company to elevate the watercraft. Each of the aforementioned methods and strategies for elevating a watercraft above a waterline has distinct and substantially similar drawbacks.

Removing a watercraft from a body of water has in the past either required physical strength to manually turn or "crank" a winch assembly to pull and secure the watercraft upon the boat trailer, or specialized heavy equipment.

Elevating a watercraft by placing the watercraft upon a mechanical raising assembly is undesirable in some instances because mechanical raising assemblies are often relatively expensive and non-portable. Mechanical raising assemblies are designed to be anchored semi-permanently to the bottom of a body of water, which necessitates an owned or leased permanent location in a relatively shallow body of water that many watercraft owners may not possess.

Employing another person or company to raise the watercraft using mechanical or other devices (e.g., using forklifts or cranes to pick up the watercraft for storage or repair) is a costly and continuing expense, and requires the watercraft owner to be limited by the hired person or company's time schedule. Employing other individuals to remove a watercraft from the water also necessitates bringing the watercraft to a particular location and/or requires the hired individual to bring relatively large machinery to the watercraft's current location.

There is therefore a need for a portable apparatus which may be employed to raise a watercraft above a waterline, and to allow safe and easy removal of the watercraft from the body of water, while being safe and easy to transport due to its portability.

There is also a need for a method for elevating a watercraft above a water line, and to allow safe and easy removal of the watercraft from the body of water which overcomes some or all of the previously delineated drawbacks of prior watercraft elevating methodologies and strategies.

There is also a need to allow for the easy storage of a watercraft, especially during the wintertime, as winterizing a watercraft can be a significant cost and burden on the owners of watercraft.

SUMMARY

The present embodiment of the invention is directed to provide a buoyancy tank designed with at least one integrated cylindrical structure for a portable floatation apparatus which may be employed to raise a watercraft above a waterline. The present embodiment of the invention is further directed to provide a buoyancy tank designed with at least one integrated cylindrical structure for a portable floatation apparatus which will allow for safe and easy removal of a watercraft from the body of water, while being safe and easy to transport due to its portability. The present embodiment of the invention is further directed to allow for the easy storage of a watercraft as the buoyancy tank designed with at least one integrated cylindrical structure which provides the necessary support to allow the watercraft to be stacked on top of the portable floatation apparatus while the portable floating apparatus is stacked on top of a boat trailer. This ability for easy and convenient storage is important in the wintertime, and it will allow a cost-efficient method of winterizing the watercraft.

Another embodiment of the invention is directed to provide a buoyancy tank designed with a plurality of integrated cylindrical structures for a portable floatation apparatus which may be employed to raise a watercraft above a waterline. The present embodiment of the invention is further directed to provide a buoyancy tank designed with a plurality of integrated cylindrical structures for a portable floatation apparatus which will allow for safe and easy removal of a watercraft from the body of water, while being safe and easy to transport due to its portability. The present embodiment of the invention is further directed to allow for the easy storage of a watercraft as the buoyancy tank designed with a plurality of integrated cylindrical structures provides the necessary support to allow the watercraft to be stacked on top of the portable floatation apparatus while the portable floating apparatus is stacked on top of a boat trailer. This ability for easy and convenient storage is important in the wintertime, and it will allow a cost-efficient method of winterizing the watercraft.

A first non-limiting advantage of the present embodiment of the invention is that the present embodiment of the invention provides a buoyancy tank designed with at least one and/or a plurality of integrated cylindrical structures which can be used as a component of a portable floatation apparatus and a method which allows for the elevating of a watercraft above a waterline in a manner which overcomes some or all of the previously delineated drawbacks of prior watercraft, specifically watercraft, elevating methodologies.

A second non-limiting advantage of the present embodiment of the invention is that the present embodiment of the invention provides a buoyancy tank designed with at least one and/or a plurality of integrated cylindrical structures which can be used as a component of a portable floatation apparatus which is adapted to elevate a watercraft and which is modular to adapt to various sized watercrafts.

A third non-limiting advantage of the present embodiment of the invention is that the present embodiment of the invention provides a buoyancy tank designed with at least one and/or a plurality of integrated cylindrical structures which can be used as a component of a portable floatation apparatus which uses compressed air to elevate a watercraft.

A fourth non-limiting advantage of the present embodiment of the invention is that the present embodiment of the invention provides a buoyancy tank designed with at least one and/or a plurality of integrated cylindrical structures which can be used as a component of a portable floatation apparatus which is stackable in order to reduce storage and transport space.

A fifth non-limiting advantage of the present embodiment of the invention is that the present embodiment of the invention provides a method for selectively and conveniently elevating a watercraft above a waterline.

A sixth non-limiting advantage of the present embodiment of the invention is that the present embodiment of the invention provides a buoyancy tank designed with at least one and/or a plurality of integrated cylindrical structures which can be used as a component of a portable floatation apparatus and a method which allows for the removal of a watercraft from a body of water in a manner which overcomes some or all of the previously delineated drawbacks of prior watercraft removal methodologies.

A seventh non-limiting advantage of the present embodiment of the invention is that the present embodiment of the invention provides a buoyancy tank designed with a plurality of integrated cylindrical structures which can be used as a component of a portable floatation apparatus and a method of storage in which the apparatus is stored and stacked on a boat trailer while a watercraft is stored and stacked on top of the apparatus.

An eighth non-limiting advantage of the present embodiment of the invention is that is that the present embodiment of the invention provides a buoyancy tank designed with at least one and/or a plurality of integrated cylindrical structures which can be used as a component of a portable floatation apparatus which is able to stack and interlock with a plurality of apparatus which enables the transportation of the apparatus at high volume.

According to an embodiment of the invention, a buoyancy tank is designed with at least one and/or a plurality of integrated cylindrical structures. The buoyancy tank is generally hollow. A pumping device can be used to displace a volume of air into the buoyancy tank which will cause the buoyancy tank to float in a body of water. Conversely, a pumping device can be used to remove a volume of air which will cause the buoyancy tank to sink in a body of water. The buoyancy tank can be used as a component of a portable floatation apparatus by use of connecting means. The integrated cylindrical structure(s) provides the necessary support to allow the safe and easy removal of a watercraft from the body of water by use of a boat trailer, as the integrated cylindrical structures will support the weight of the watercraft and the portable floatation apparatus and will prevent the collapse of the buoyancy tanks. Further, the integrated cylindrical structure(s) will further allow for the easy storage of a watercraft as the buoyancy tank designed with the cylindrical structure(s) provides the necessary support to allow the watercraft to be stacked on top of the portable floatation apparatus while the portable floating apparatus is stacked on top of a boat trailer.

According to a further embodiment of the invention, a method for elevating a watercraft above a water line is provided, the method comprising the steps of forming a floatation apparatus comprising a plurality of substantially identical buoyancy tanks with at least one and/or a plurality of integrated cylindrical structures, a plurality of substantially identical base portions, a plurality of conduits, a plurality of horizontal and vertical beams connected as a frame, a plurality of t-shaped support bodies, a plurality of hull supporting means having a concave top surface; providing a pumping device; coupling said pumping device to said conduits, coupling said conduits to the buoyancy tanks with at least one and/or a plurality of integrated cylindrical structures, and coupling the plurality of buoyancy tanks with at least one and/or a plurality of integrated cylindrical structures to said base portions, effective to form a floatation apparatus; placing said floatation apparatus beneath said hull portion of said watercraft; and causing said pumping device to displace a volume of air into each of said plurality of buoyancy tanks with at least one and/or a plurality of integrated cylindrical structures, effective to raise said watercraft out of said body of water.

According to a further embodiment of the invention, a method for removing a watercraft from a body of water is provided, the method comprising the steps of; forming a floatation apparatus comprising a plurality of substantially identical buoyancy tanks with at least one and/or a plurality of integrated cylindrical structures to support the apparatus in transport and storage, a plurality of substantially identical base portions, a plurality of conduits, a plurality of horizontal and vertical beams connected as a frame with a modular design which allows for lifting means to be installed to assist in storage and removal from boat trailer, a plurality of t-shaped support bodies, a plurality of hull supporting means having a concave top surface; providing a pumping device; coupling said pumping device to said conduits, coupling said conduits to the substantially identical buoyancy tanks with at least one and/or a plurality of integrated cylindrical structures, and coupling the substantially identical buoyancy tanks with at least one and/or a plurality of integrated cylindrical structures to said base portions, effective to form a floatation apparatus; placing said floatation apparatus beneath said hull portion of said watercraft; and causing said pumping device to displace a volume of air into each of the substantially identical buoyancy tanks with at least one and/or a plurality of integrated cylindrical structures, effective to raise said watercraft out of said body of water, providing a watercraft trailer; causing the watercraft trailer to be placed in the water under the raised floatation apparatus, preferably by use of a boat ramp; lowering the floatation apparatus by releasing said air contained within the substantially identical buoyancy tanks with at least one and/or a plurality of integrated cylindrical structures, effective to lower said watercraft onto the watercraft trailer, causing the boat trailer with floatation apparatus and watercraft resting on top of boat trailer, to be removed from the water, preferably by use of a boat ramp.

DETAILED DESCRIPTION

Figure 1:
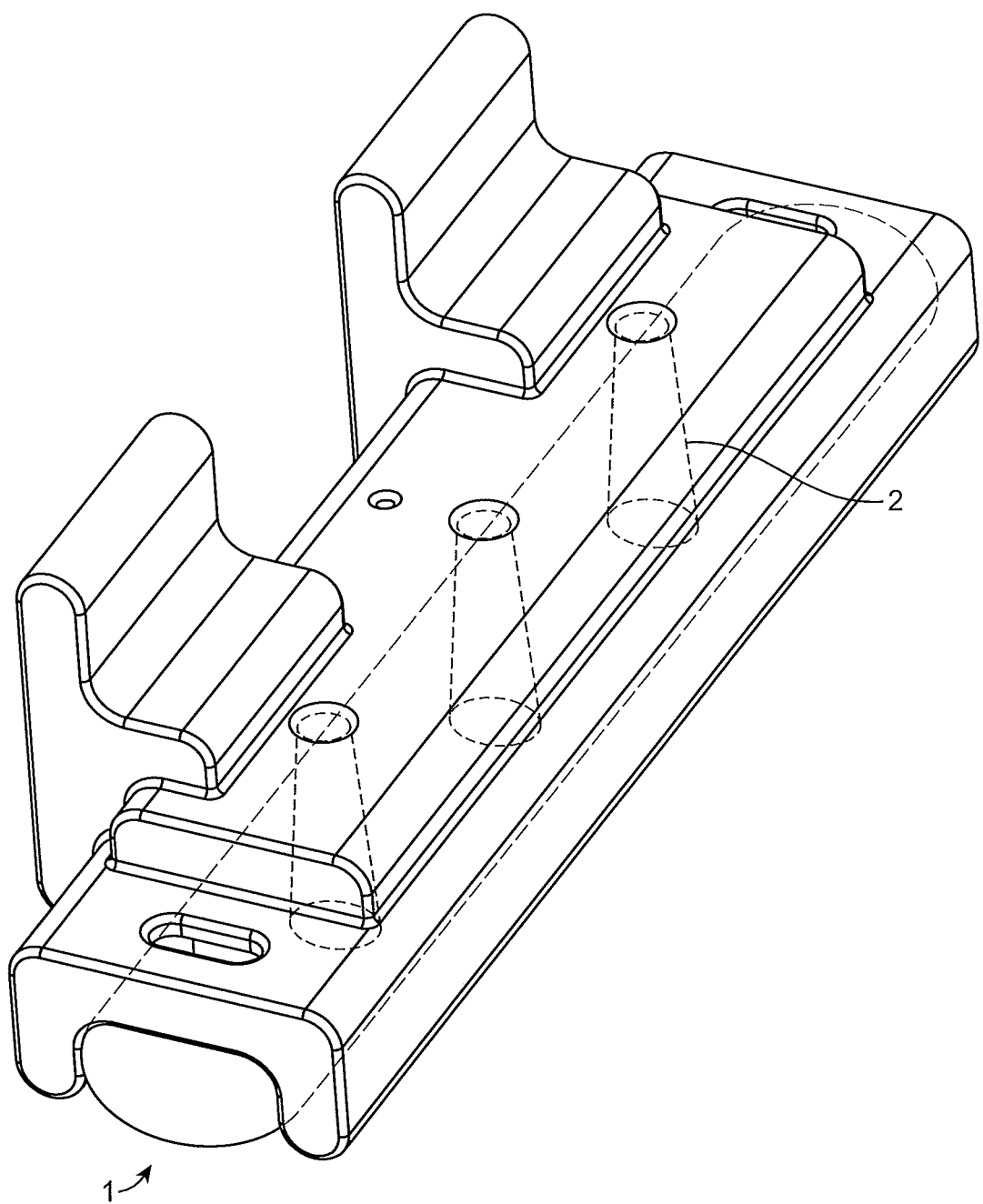
FIG. 1 is a perspective assembled view of a buoyancy tanks with a plurality of integrated cylindrical structures with a base support and a plurality of supporting T-structures.
Figure 2:
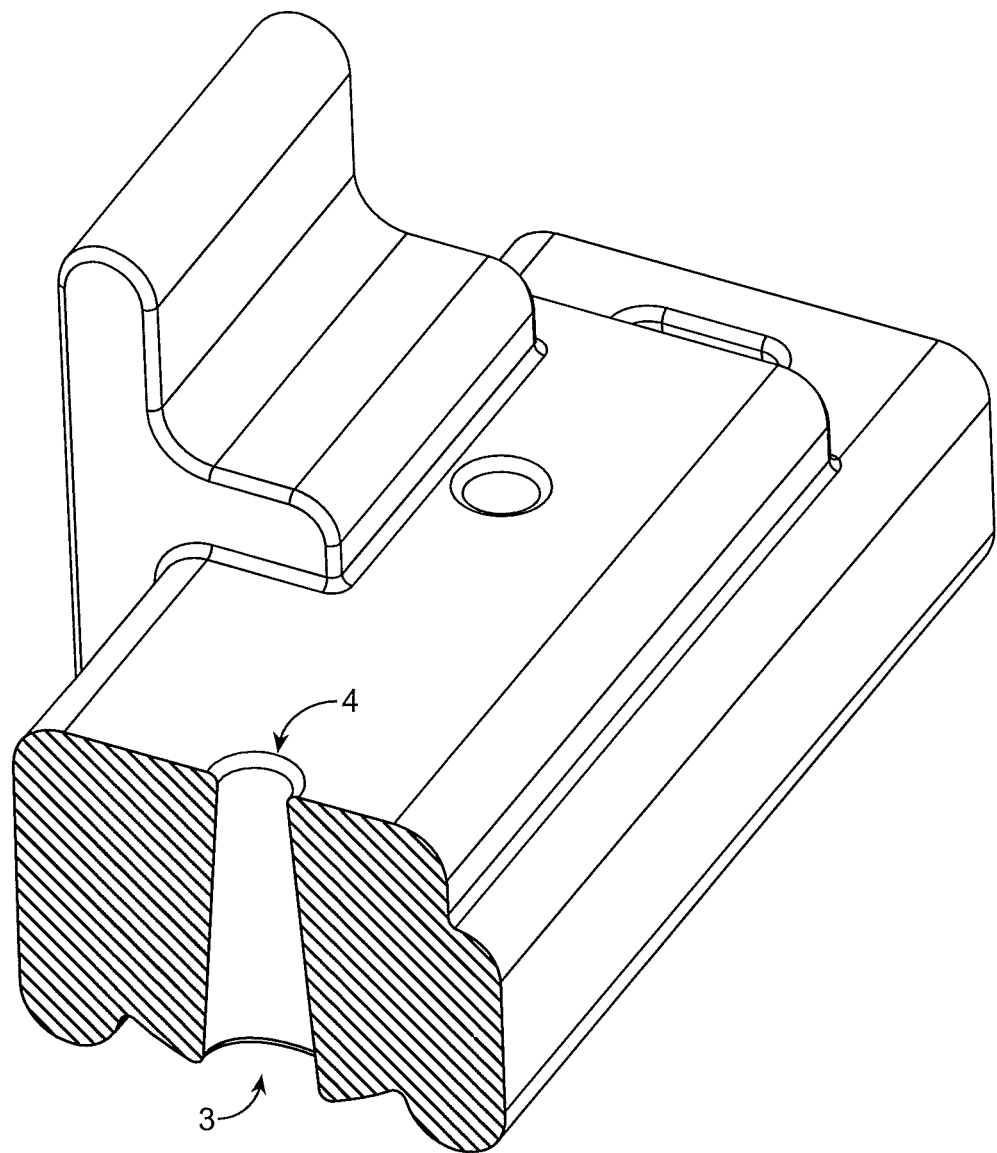
FIG. 2 is a cross sectional view of a buoyancy tanks with a plurality of integrated cylindrical structures with a base support and a plurality of supporting T-structures. The cross sectional shows the integrated cylindrical structure.
Figure 3:
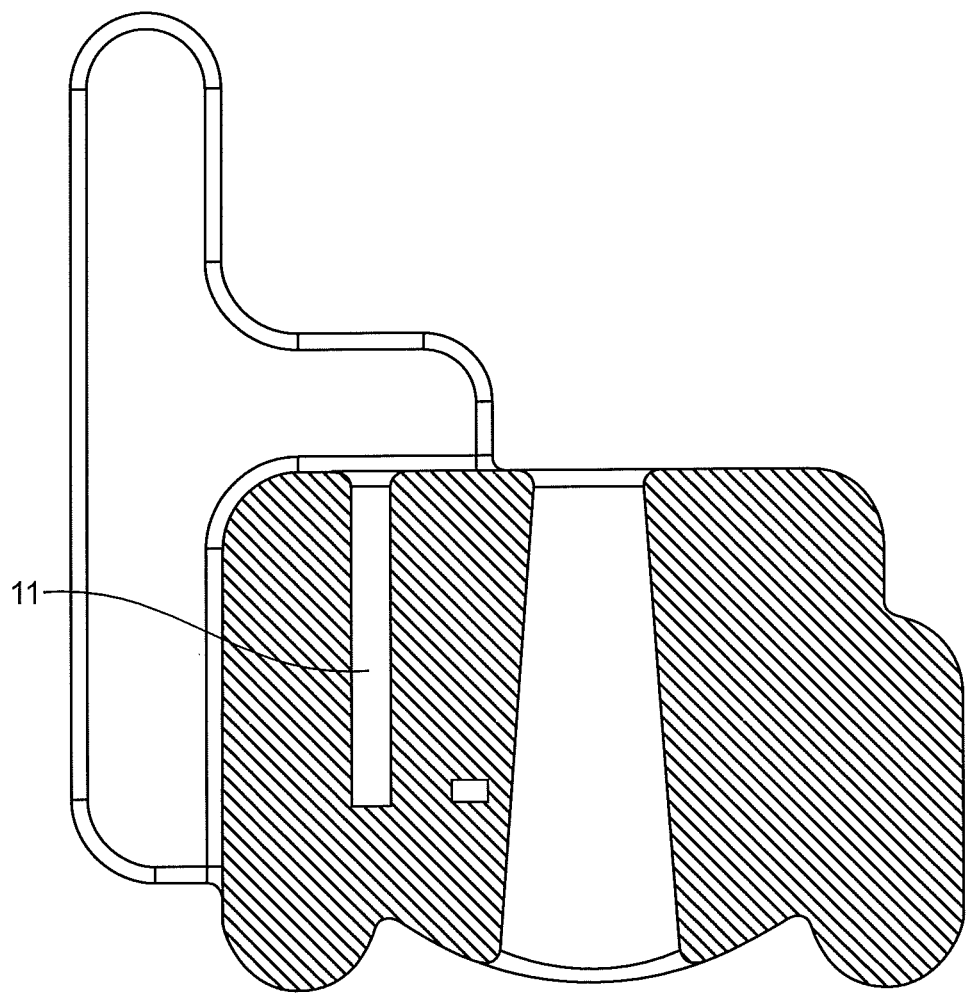
FIG. 3 is a side view of a cross sectional view of a buoyancy tanks with a plurality of integrated cylindrical structures with a base support and a plurality of supporting T-structures. The cross sectional shows the integrated cylindrical structure.
Figure 4:
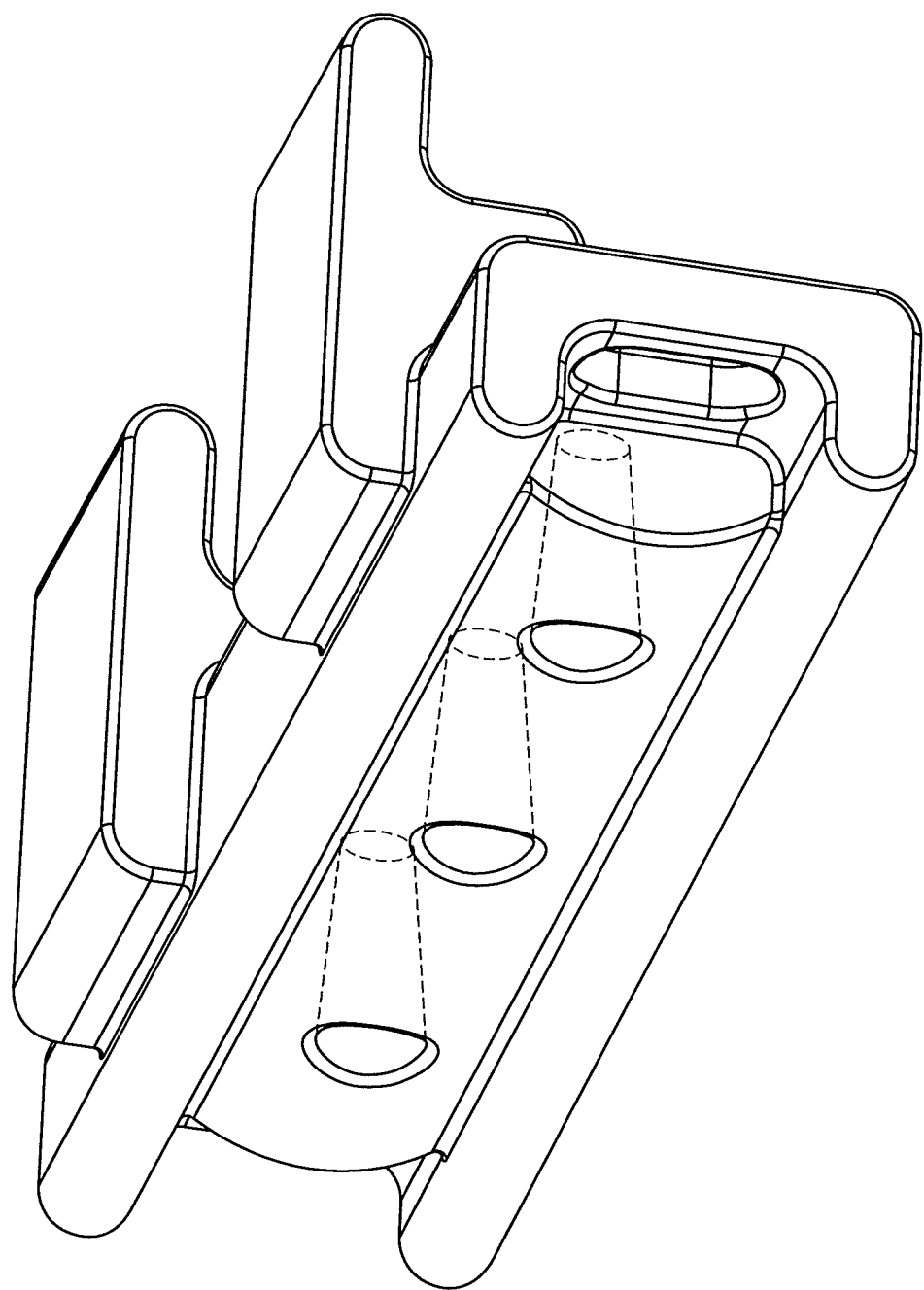
FIG. 4 is a perspective assembled view of a buoyancy tanks with a plurality of integrated cylindrical structures with a base support and a plurality of supporting T-structures. This view is from the bottom of the buoyancy tank.

Referring now to FIG. 1, there is shown a buoyancy tank 1 with a plurality of integrated cylindrical structures 2. The integrated cylindrical structures 2 may have a conical frustum shape and consist of a hollow opening in the buoyancy tank 1, with a wider opening on the bottom of the tank 3, and a narrower opening at the top of the tank 4. FIGS. 2 and 3 show a cross sectional view of the integrated cylindrical structure.

Figure 6:
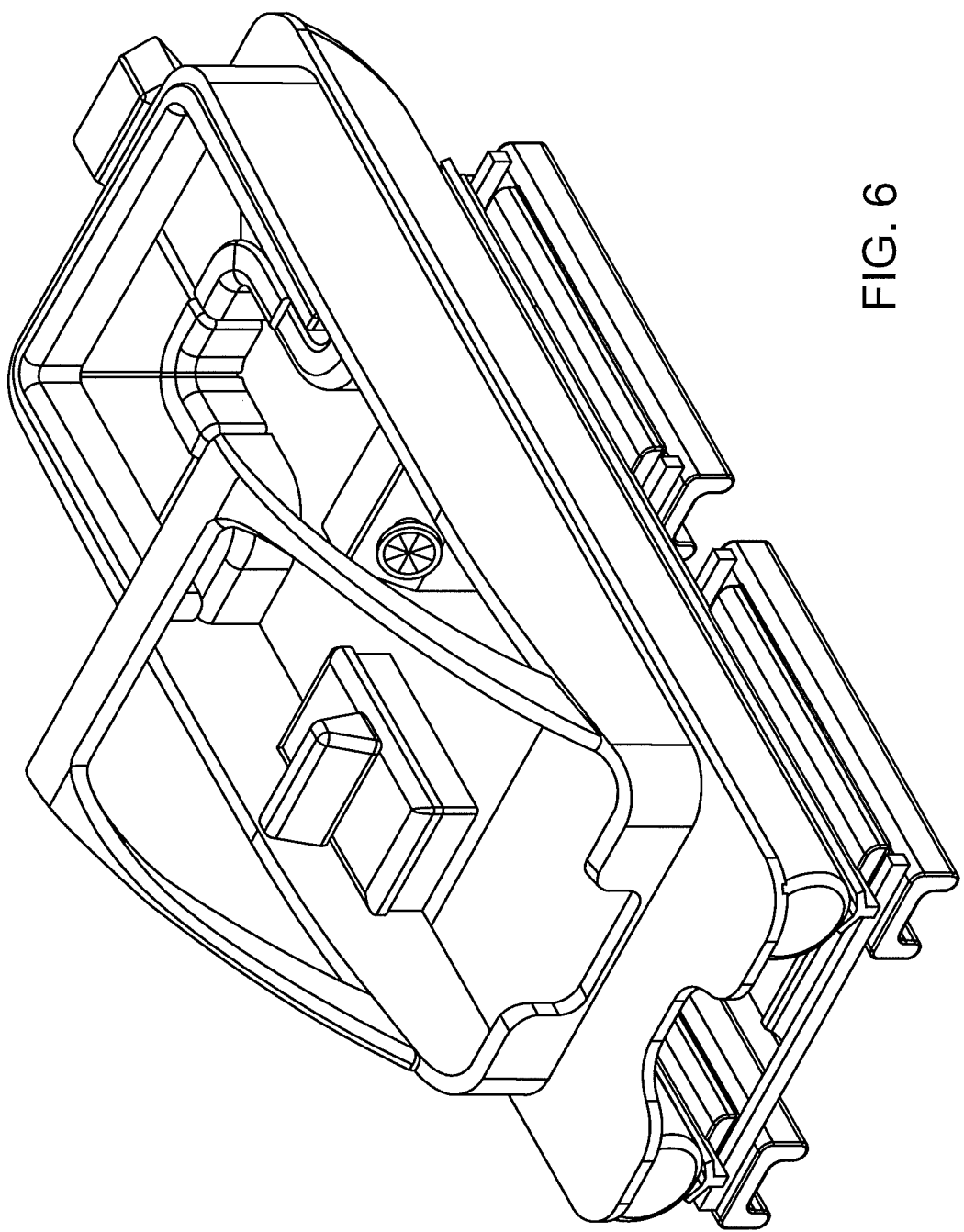
FIG. 6 is a perspective view of a watercraft stacked on top of a boat lift with a plurality of buoyancy tanks with a plurality of integrated cylindrical structures.
Figure 7:
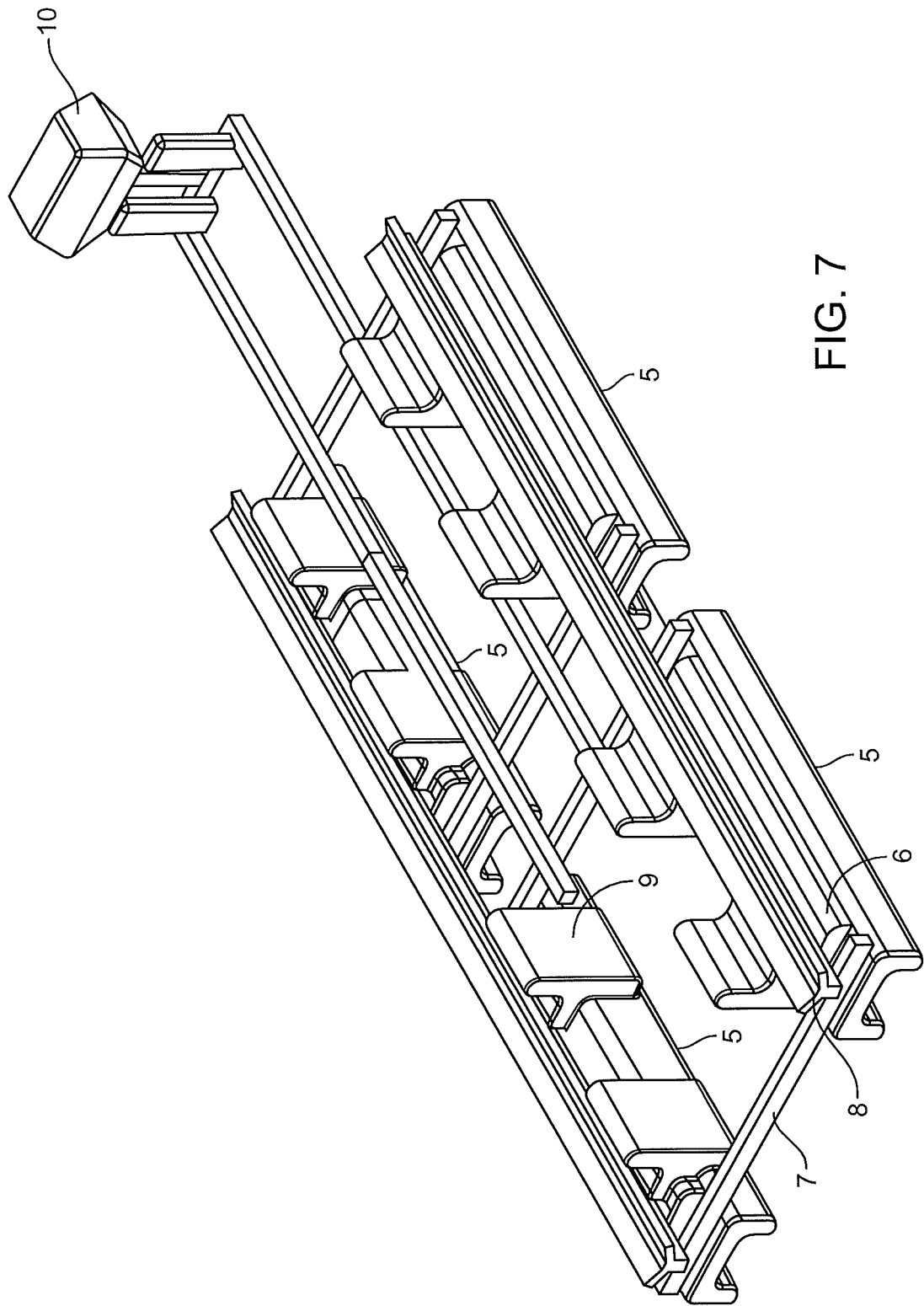
FIG. 7 is a perspective view of a boat lift with a plurality of buoyancy tanks with a plurality of integrated cylindrical structures.

Referring now to FIG. 7, there is shown a plurality of substantially identical buoyancy tanks with a plurality of integrated cylindrical structures as a component of a portable floatation apparatus which is made in accordance with the teachings of a preferred embodiment of the invention. As shown, the substantially identical buoyancy tanks 5 with a plurality of integrated cylindrical structures are a component of the portable floatation apparatus. Referring now to FIG. 1, the substantially identical buoyancy tanks 1 with a plurality of integrated cylindrical structures 2 are constructed from a relatively thin, lightweight, and durable material that is gas impermeable. For example and without limitation, the buoyancy tanks 1 with a plurality of integrated cylindrical structures 2 may be constructed of an injection molded polymer material. The buoyancy tanks 1 are designed with a plurality of integrated cylindrical structures 2 which support the floatation apparatus in transport and storage. As shown in FIG. 7, The buoyancy tanks 5 are connected to base portions 6 which preferably provide additional support to the buoyancy tanks. The plurality of buoyancy tanks 5 and plurality of base portions 6 are connected by a plurality of conduits and a plurality of horizontal and vertical beams 7 connected as a frame. The plurality of horizontal and vertical beams connected as a frame has a modular design which allows for lifting means to be installed to assist in storage and removal from a boat trailer. A plurality of hull supporting means 8 having a concave top surface is connected to the plurality of base portions 6 and the plurality of horizontal and vertical beams 7 connected as a frame. The plurality of hull supporting means 8 has a top surface which couples to a hull of a boat and will allow the hull of a boat to rest upon said top surface, as illustrated in FIG. 6. A plurality of t-shaped support bodies 9 are connected between the plurality of hull supporting means 8 and the plurality of base portions 6 and optimally provide additional support. A control device for an air pumping device 10 is connected to the plurality of horizontal and vertical beams 7 connected as a frame. The air pumping device is connected to the plurality of buoyancy tanks 5 by coupling said pumping device to a plurality of conduits, coupling said plurality of conduits to the plurality of buoyancy tanks. The air pumping device 10 allows the floating apparatus to rise in a body of water by filling the plurality of buoyance tanks with air. The air pumping device allows the floating apparatus to lower in a body of water by allowing the plurality of buoyancy tanks to be filled with water by removing the air.

The air pumping device may fill a certain number of buoyancy tanks 5 with air by use of the air inlet tube 11, or allow a certain number of buoyancy tanks 5 to be filled with water, in the event it is desired that the floatation apparatus be tilted. One non-limited reason that the floatation apparatus may be tilted is to engage the floatation apparatus with a boat lift, or to engage a watercraft with the floating apparatus.

Generally the plurality of hull supporting means 8 is designed to engage the hull of a watercraft to effectively to hold or contain the watercraft. T-shaped support bodies 9 provide additional support to a watercraft and the watercraft's hull.

Figure 5:
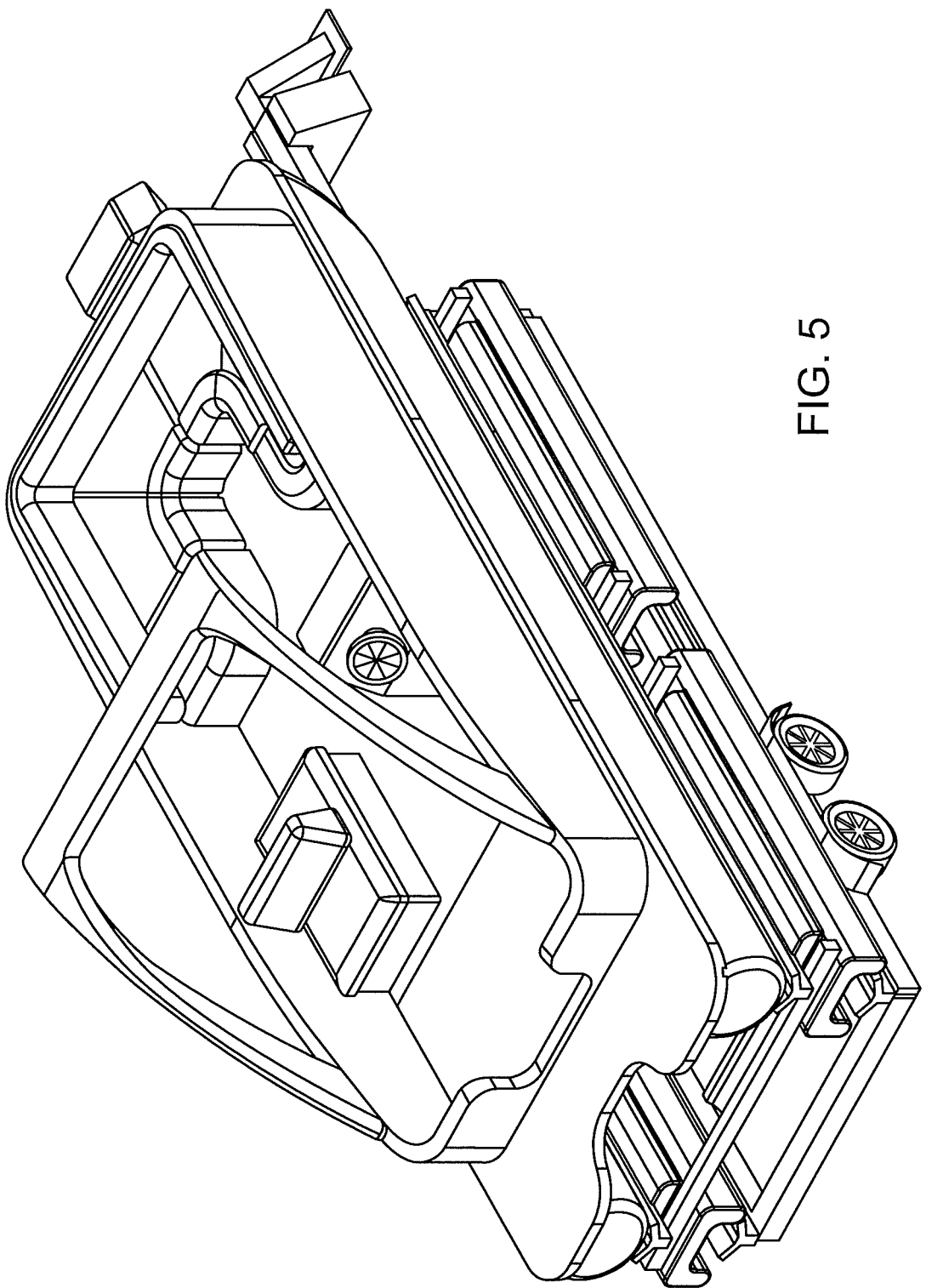
FIG. 5 is a perspective view of a watercraft stacked on top of a boat lift with a plurality of buoyancy tanks with a plurality of integrated cylindrical structures, with the boat lift stacked on top of a boat trailer.

Importantly, as best shown in FIG. 5, the floating apparatus is able to be placed on a boat trailer while a watercraft is on top of the floating apparatus. This position shown in FIG. 5 may be maintained for a long duration without damage to the floating apparatus due to at least one and/or the plurality of cylindrical structures integrated in the buoyancy tanks.

The floating apparatus is able to be stacked and interlocked with other floating apparatus which allows the transportation and storage of the floating apparatus in high volume.

In operation, a user seeking to elevate a watercraft positions the floating apparatus beneath a watercraft and couples the hull supporting means 8 of the floating apparatus with the hull of a watercraft. The air pump then selectively displaces a volume of air through the plurality of conduits and into the substantially identical buoyancy tanks 5 with a plurality of integrated cylindrical structures 2 of the floatation apparatus. Air pump increases the atmospheric pressure within each buoyancy tank effective to increase the buoyancy of the floatation apparatus. The watercraft is effectively and conveniently lifted by the floatation apparatus as the buoyancy level of the floatation apparatus is progressively increased.

In operation, a user seeking to remove a watercraft first positions the floating apparatus beneath a watercraft and couples the hull supporting means 8 of the floating apparatus to the hull of a watercraft. The air pump then selectively displaces a volume of air through the plurality of conduits and into the substantially identical buoyancy tanks 5 with at least one and/or a plurality of integrated cylindrical structures 2 of the floatation apparatus. The air pump increases the atmospheric pressure within each buoyancy tank effective to increase the buoyancy of the floatation apparatus. The watercraft is effectively and conveniently lifted by the floatation apparatus as the buoyancy level of the floatation apparatus is progressively increased. The floatation apparatus and watercraft are then piloted toward the shore, preferably toward a boat ramp. A boat trailer is positioned under the floatation apparatus. The air pump then releases a volume of air through the plurality of conduits into the atmosphere and allows the substantially identical buoyancy tanks with at least one and/or a plurality of integrated cylindrical structures to fill with water. The watercraft and floating apparatus are lowered into the water and onto the boat lift. The boat trailer is then taken out of the water with the floatation apparatus and watercraft on top. Preferably, the boat trailer is taken out of the water by use of an automobile. This is made possible because the integrated cylindrical structure(s) which are built into the buoyancy tanks give the necessary support to support the weight of the watercraft and floating apparatus.

It should be understood that this invention is not limited to the exact construction or embodiments listed and described, but that various changes may be made without departing from the spirit and scope of the invention. For example, and without limitation, the buoyancy tanks with a plurality of integrated cylindrical structures may be of substantially any shape or size depending upon the amount of buoyancy needed or the size of the floatation apparatus. Further, the buoyancy tanks with at least one and/or a plurality of integrated cylindrical structures may be used in other configurations of floatation apparatus.

What is claimed is:

1. A buoyancy tank comprising:
   a hollow body having a top, a bottom, and sides;
   a plurality of top openings on the top of the body, wherein each of the top openings is wholly bounded by the top of the body such that the top openings do not open to the sides of the body;
   a plurality of bottom openings on the bottom of the body, wherein each of the bottom openings is wholly bounded by the bottom of the body such that the bottom openings do not open to the sides of the body; and
   plurality of integrated conical frustum structures connecting the top openings to the bottom openings such that the integrated conical frustum structures do not open to the sides of the body, wherein the integrated conical frustum structures are configured to provide support to the buoyancy tank when weight is applied to the top.

2. The buoyancy tank of claim 1, wherein bottom openings are wider than the top openings such that the plurality of integrated conical frustum structures are wider at the bottom of the buoyancy tank and narrower at the top of the buoyancy tank.

3. The buoyancy tank of claim 1, wherein the plurality of integrated conical frustum structures and the body of the buoyancy tank are composed of a plastic polymer.

4. A floatation apparatus comprising:
   a plurality of substantially identical buoyancy tanks, wherein each buoyancy tank comprises a hollow body having a top, a bottom, and sides; a plurality of top openings on the top of the body, wherein each of the top openings is wholly bounded by the top of the body such that the top openings do not open to the sides of the body; a plurality of bottom openings on the bottom of the body, wherein each of the bottom openings is wholly bounded by the bottom of the body such that the bottom openings do not open to the sides of the body; and a plurality of integrated conical frustum structures connecting the top openings to the bottom openings such that the integrated conical frustum structures do not open to the sides of the body, wherein the integrated conical frustum structures are configured to provide support to the buoyancy tank when weight is applied to the top;
   a plurality of substantially identical base portions;
   a plurality of conduits;
   a pumping device;
   a plurality of horizontal and vertical beams connected as a frame with a modular design;
   a plurality of t-shaped support bodies; and
   a plurality of hull supporting means;
   wherein the flotation apparatus is mobile and configured to detachably engage with a hull of a watercraft.

5. The floatation apparatus of claim 4, wherein said plurality of hull supporting means has a concave top surface.

6. The floatation apparatus of claim 4, wherein said pumping device is a manual hand pump.

7. The floatation apparatus of claim 4, wherein said pumping device is an electric air pump.

8. The floatation apparatus of claim 4, wherein the plurality of horizontal and vertical beams connected as a frame has a modular design which allows for a boat to be installed on to the frame.

9. The floatation apparatus of claim 4, wherein said floatation apparatus is able to stack and interlock with other floatation apparatus.

10. The floatation apparatus of claim 4, wherein said floatation apparatus comprises at least 4 buoyancy tanks and at least 4 substantially identical base portions.

11. The floatation apparatus of claim 5, wherein said plurality of hull supporting means having a concave top surface frictionally engages the hull of the watercraft.

12. A buoyancy tank comprising:
    a hollow body having a top, a bottom, and sides;
    at least one top opening on the top of the body, wherein the top opening is wholly bounded by the top of the body such that the top opening does not open to the sides of the body;
    at least one bottom opening on the bottom of the body, wherein bottom opening is wholly bounded by the bottom of the body such that the bottom opening does not open to the sides of the body; and
    at least one integrated conical frustum structure connecting the top opening to the bottom opening such that the integrated conical frustum structure does not open to the sides of the body, wherein the integrated conical frustum structure is configured to provide support to the buoyancy tank when weight is applied to the top.

13. The buoyancy tank of claim 12, wherein the bottom opening(s) are wider than the top opening(s) such that the integrated conical frustum(s) is/are wider at the bottom of the buoyancy tank and narrower at the top of the buoyancy tank.

14. The buoyancy tank of claim 12, wherein the integrated conical frustum structure(s) and the body of the buoyancy tank are composed of a plastic polymer.

15. A floatation apparatus comprising:
    a plurality of substantially identical buoyancy tanks, wherein each buoyancy tank comprises a hollow body having a top, a bottom, and sides; at least one top opening on the top of the body, wherein the top opening is wholly bounded by the top of the body such that the top opening does not open to the sides of the body; at least one bottom opening on the bottom of the body, wherein the bottom opening is wholly bounded by the bottom of the body such that the bottom opening does not open to the sides of the body; and at least one integrated conical frustum structure connecting the top opening to the bottom opening such that the integrated conical frustum structure does not open to the sides of, wherein the integrated conical frustum structure is configured to provide support to the buoyancy tank when weight is applied to the top;
    a plurality of substantially identical base portions;
    a plurality of conduits;
    a pumping device;
    a plurality of horizontal and vertical beams connected as a frame with a modular design;
    a plurality of t-shaped support bodies; and
    a plurality of hull supporting means;
    wherein the flotation apparatus is mobile and configured to detachably engage with a hull of a watercraft.

16. The floatation apparatus of claim 15, wherein said plurality of hull supporting means has a concave top surface.

17. The floatation apparatus of claim 15, wherein said pumping device is a manual hand pump.

18. The floatation apparatus of claim 15, wherein said pumping device is an electric air pump.

19. The floatation apparatus of claim 15, wherein the plurality of horizontal and vertical beams connected as a frame has a modular design which allows for a boat lift to be installed on to the frame.

20. The floatation apparatus of claim 15, wherein said floatation apparatus is able to stack and interlock with other such floatation apparatus.

21. The floatation apparatus of claim 15, wherein said floatation apparatus comprises at least 4 buoyancy tanks and at least 4 substantially identical base portions.

22. The floatation apparatus of claim 16, wherein said plurality of hull supporting means having a concave top surface frictionally engages the hull of the watercraft.

\* \* \* \* \*